United States Patent [19]
Crawford

[11] 3,746,360
[45] July 17, 1973

[54] HAND TRUCK WITH ADJUSTABLE TOE PIVOT MEANS

[76] Inventor: Burdette B. Crawford, 511 Elm St., Chadbourn, N.C. 28431

[22] Filed: Dec. 27, 1971

[21] Appl. No.: 212,560

Related U.S. Application Data
[62] Division of Ser. No. 29,028, April 16, 1970, Pat. No. 3,642,301.

[52] U.S. Cl. .......................... 280/47.12, 280/47.27
[51] Int. Cl. ............................................ B62b 1/12
[58] Field of Search ...................... 280/43.1, 43.12, 280/47.12, 47.27, 47.28, 47.29; 214/370, 371, 372, 373

[56] References Cited
UNITED STATES PATENTS

| | | | |
|---|---|---|---|
| 2,546,876 | 3/1951 | Sutherland | 280/47.27 |
| 408,568 | 8/1889 | Amos | 280/43.1 |
| 310,485 | 1/1885 | Wing | 280/47.12 |
| 1,539,933 | 6/1925 | Britton | 280/47.29 |
| 2,300,165 | 10/1942 | Mustafa | 280/47.12 |

FOREIGN PATENTS OR APPLICATIONS

| | | | |
|---|---|---|---|
| 241,967 | 12/1962 | Australia | 280/47.28 |

*Primary Examiner*—Leo Friaglia
*Assistant Examiner*—Leslie J. Paperner
*Attorney*—B. B. Olive

[57] ABSTRACT

A two-wheel, tilt type hand truck incorporates an axle-wheel arrangement for transporting the load and a movable toe pivot which is releasably engageable with the floor to provide pivotal support for the load in forward tilted positions and for rearward tilting.

8 Claims, 12 Drawing Figures

PATENTED JUL 17 1973

HAND TRUCK WITH ADJUSTABLE TOE PIVOT MEANS

CROSS-REFERENCE TO RELATED APPLICATION

This application is a division of my copending application Ser. No. 29,028, filed Apr. 16, 1970, under the title "Hand Truck with Means for Shifting Center of Gravity of Load", now U.S. Pat. No. 3,642,301.

BACKGROUND OF THE INVENTION

1. Field of the Invention

This invention relates to hand trucks and more particularly to manually operable, two-wheel hand trucks having shiftable pivot means for providing pivotal support auxiliary to the wheel support.

2. Description of the Prior Art

The prior art hand trucks most commonly in use for handling bags of fertilizer, cement, feed, etc., are those having tongs which are adapted to grip or support arms to be slid under the load to be transported. Pallets are normally but not necessarily used. Two people are usually required to load and unload these trucks. In loading, once the hand truck is ready to be tilted backward, a second person must steady the load especially with high stacked and heavy loads, so that the load isn't tilted forward and cast off. Also, once the load has been moved and the operator is ready to set the load down, the second person must again steady the load so that it will not be thrown forward. Some hand trucks have applied devices which secure the vertical stacked loads to the truck before moving so the load will not fall forward, however, even these hand trucks allow the load weight to suddenly be shifted and placed upon the operator's arms.

Some prior art patents teach improved hand trucks having movable axles, however, even these patents leave much to be desired. U.S. Pat. Nos. 729,931; 2,292,605; 2,485,545; 2,574,825; 2,607,606 and 2,650,834 as examples all provide movable wheels and axles. However, these hand trucks provide no means of adjustment for regulating the amount of travel of the wheels and axle to the load. Their axle travel would be the same for extremely heavy loads as well as for lighter loads. Thus, it would be desirable to provide adjustment for wheel and axle travel dependent upon the load weight but none of the prior patents teach such a desirable feature. Moreover, none of the prior patents teach advantageous, movable initial and intermediate pivot means. See U.S. Pat. Nos. 310,485 and 2,300,165 and British Patent 731,644 of June 8, 1955.

It is evident that the hand truck of the prior art may be improved upon to a significant degree and it is to this end that this invention as shown and described herein is directed.

SUMMARY OF THE INVENTION

The hand truck of the invention slidably mounts the axle on a pair of side frames extending behind the front loading frame. A pair of springs constantly urge the axle and its wheels downwardly. The hand truck has a pair of rearwardly disposed handles for the operator and a generally conventional pair of load support members, sometimes called shoes or tongs, which are moved in under the pallet or load when the hand truck is positioned vertically during loading. Before tilting the truck rearwardly with the load the load support members are pressed up against the bottom of the pallet by means of a pair of vertically movable toe members which are operated through a hand lever and linkage. These toe members when moved down engage the floor below the front loading plane and the parallel center of gravity load plane being greater than the distance shown as Y in FIG. 4 between the toe members and the same load center of gravity plane and once locked in a lower position provide a pair of pivotal supports for tilting the load rearwardly. Integral with the toe members there is also provided a pair of intermediate pivot members which are at a slightly higher elevation than the toe members but which move and are locked in place with the toe members. As the hand truck is tilted back with a loaded pallet the truck first pivots on the toe members and then on the intermediate pivot members and finally on the wheels. The wheels however do not immediately assume the full load since as the truck is tilted rearwardly the axle slides vertically upwardly on the side frames until the axle engages adjustable stops. These stops are in turn positionable according to the weight of the load. The load center of gravity, relative to the axle, during transport can thus be regulated according to the amount of load weight, and the load balanced for ease of tilting and transport. For light loads the axle stops are located for very short vertical axle movement on the side frames whereas for heavy loads the stops are positioned for relatively long axle movement so as to shift the load center of gravity toward the top of the loading frame. When the truck reaches the spot at which the loaded pallet is to be left, the operator reverses the tilting procedure. As the truck is tilted forward the axle is urged down by the springs and moves toward its bottommost position. As the truck tilts forward, the load is first substantially relieved from the wheels, is next returned to the intermediate pivots and, as tilting continues, is then transferred to the toe members when the truck reaches its vertical position and the loaded pallet is again resting on the floor. The toe members are finally disengaged from the floor by being moved vertically and the truck is free to be moved to another loaded pallet. In none of these operations is there any tendency to lose the load as in the prior art trucks.

Therefore, an object of the invention is to provide a hand truck adapted for use in connection with moving heavy, bulky and normally difficult to handle loads.

Another object is to provide a new and improved hand truck of the type having a shifting center of gravity of the load with respect to the wheels and axle whereby heavy and bulky loads are handled with greater ease than heretofore.

These and other objects of the invention will become apparent when the following detailed description is read in conjunction with the accompanying drawings, in which:

DESCRIPTION OF THE PREFERRED EMBODIMENT

Figure 1:
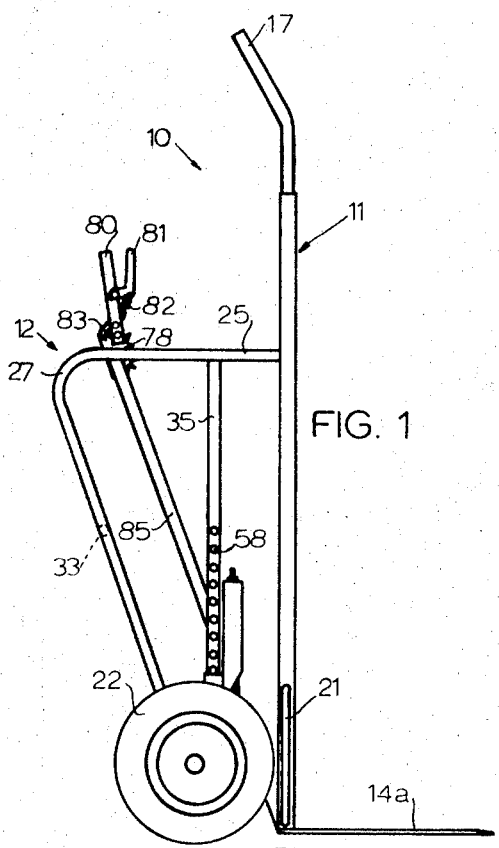
FIG. 1 is a side elevation view of the hand truck of this invention.
Figure 2:
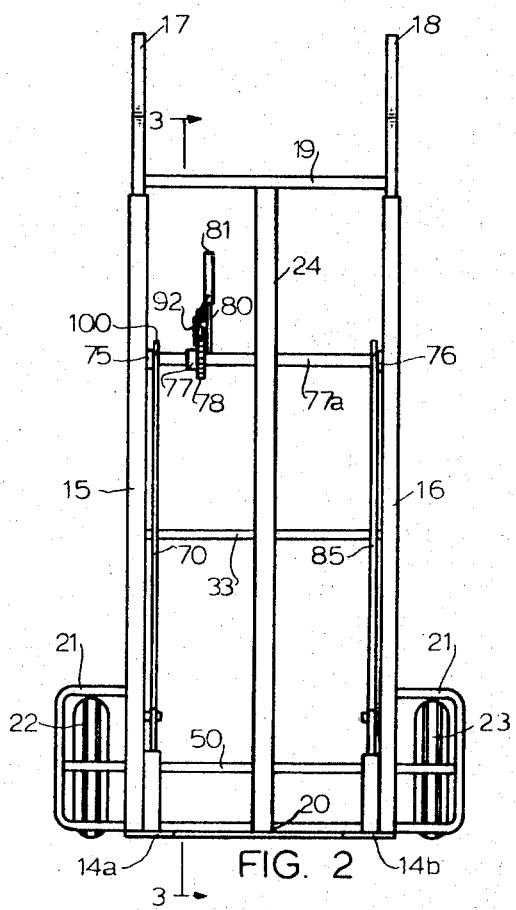
FIG. 2 is a front elevation view of the hand truck of FIG. 1.
Figure 4:
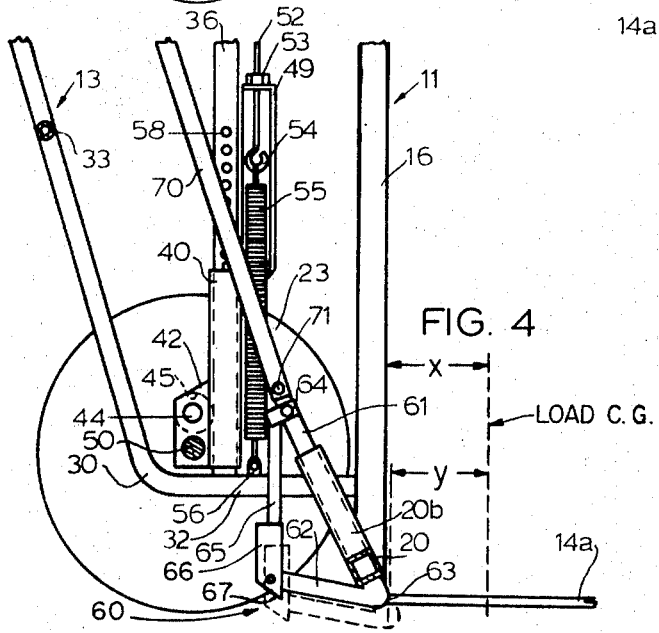
FIG. 4 is an enlarged, fragmentary, elevation section view illustrating one of the toe members in a raised position and also showing one intermediate pivot and one of the sliding axles and frame structure, the dashed lines indicating a lowered position.

In the drawings, the reference character 10 indicates generally the hand truck of this invention which is shown as being formed with a front frame 11 and a pair of side frames 12 and 13. Frames 11, 12 and 13 are shown as being formed of bent tubing and made integral by welding frames 11, 12 and 13 together.

Front frame 11 is comprised of vertical tubes 15 and 16, vertical extensions 17, 18 in the form of hand holds and horizontal tube 19 extending laterally between extensions 17, 18. A pair of substantially U-shaped tubes 20a, 20b are made integral, by welding, with vertical tubes 15 and 16. U-shaped tubes 20a and 20b are welded to the base of hand truck 10 and the free end extends upward and backward away from front frame 11. Also welded to frame 11 are a pair of wheel guards 21 which prevent any portion of the load from coming into sliding contact with rotation of wheels 22, 23. Extending downward in a plane parallel to tubes 15 and 16 is flat metal member 24. Flat member 24 is welded at its upper end to cross-member 19 and is welded at its base to U-shaped member 20. Member 24 is designed to add support to front frame 11 and to support extremely heavy loads during tilting. Load bearing members 14a, 14b extend outward from load bearing surface 11 and are integral with the base of hand truck.

Approximately midway the length of vertical tubes 15 and 16, tubes 25, 26 are made integral with tubes 15 and 16 and extend outward at right angles thereto. Tubes 25, 26 are bent at curves 27, 28 and continue from curvatures 27, 28 to extend downward at a predetermined angle until they form curvatures 29, 30. At this point, tubes 31, 32 extend beyond curvatures 29, 30 and are generally parallel with tubes 25, 26. The free ends of tubes 31, 32 are welded to vertical tubes 15, 16 respectively. Tube 33 extends between frames 12, 13 and supports the operator's foot when he tilts the load back. A pair of vertical bars 35, 36 extend upward at right angles from horizontal tubes 31, 32 respectively and are welded to tubes 25, 26 respectively at their upper ends. Bars 35, 36 are vertically aligned and are parallel to vertical tubes 15 and 16. Bars 35, 36 have beginning at a predetermined point several longitudinally spaced holes drilled therein through which heavy cotter pins or the like may be placed and which will be described later in the description.

The description will now shift to the sliding axle and wheel assembly and for ease in describing the assembly, only one side will be described since both wheels are mounted on the same axle and the assemblies are identical. Vertical bar 36 is integrally mounted on tube 32 by means of welding. Prior to welding bar 36 to tube 32, a sleeve member 40 is slid onto bar 36. Once bar 36 is welded to tube 32 at its base and welded to tube 26 at its uppermost end, sleeve 40 is slideable on bar 36 but is not removable therefrom. Plates 41a, 41b are welded to sleeve 40 adjacent its base. Plates 41a, 41b have a pair of holes 42, 43 respectively therein. Holes 42, 43 receive a small shaft 44 which shaft in turn receives a roller 45. Roller 45 extends through a slot (not shown) in sleeve 40 and rolls against bar 36 when in use. Axle 50 passes through plates 41a, 41b and mounts on one end a wheel 23. An angle member 49 is welded to sleeve 40 so as sleeve 40 rides up and down on bar 36, angle member 49 moves therewith. The upper end of angle member 49 is closed by plate 51. Plate 51 has a central hole through which a rod 52 passes. Rod 52 receives a nut 53 on its outer end and rod 52 terminates in a rounded hook 54 which extends downward. A coil spring 55 is secured to hook 54 and extends downward. A small plate 56 is welded to tube 32. Plate 56 receives the free end of spring 55. Spring 55 now acts to hold a sleeve 40 down adjacent tube 32. As sleeve 40 rides up and down on bar 36 spring 55 expands and contracts with this movement. A cotter pin, or the like, 57 is designed to fit into one of several holes 58 in bar 36. Cotter pin 57 limits and determines the upward limits of travel of sleeve 40. Thus, the upward movement of axle 50 and consequently the disposition of the load center of gravity relative to axle 50 can be controlled by the positioning of pin 57.

Previously mentioned U-shaped tubes 20a, 20b are integrally welded to tubes 15 and 16 respectively and the free-end extends upward and backward at an angle from front plane 11. U-shaped tube 20b will be described in detail and it should be understood that U-shaped tube 20a is identical to tube 20b and will therefore not be described. A V-shaped member or toe member 60 has one long leg 61 and one short leg 62. Legs 61 and 62 terminate at 63. Long leg 61 passes through tube 20b and has a small plate 64 rigidly secured at a predetermined point. Rectangular bar 65 is rigidly secured to plate 64 and extends downward substantially parallel to front load plane 11. Bar 65 has integrally secured to its lower end a plate 66 which has an angled base 67. Plate 66 is made integral with short leg member 62 of toe member 60. Leg 61 can slide within tube 20b without being withdrawn therefrom. The extreme uppermost end of leg 61 has a connecting bar 70 pivotally mounted therewith at 71. It is to be understood that all of this mechanism is repeated for the other side of the hand truck.

Referring now to FIGS. 1, 2, 3 and 12, a pair of sleeves 75, 76 extend outward from tubes 25, 26 respectively and are welded to these tubes. Another sleeve 77 has a half-moon shaped disc 78 made integral therewith and which has notches 79 cut along its outer periphery. Sleeve 77 and disc 78 are fixedly secured to a tube 90 by means of bar 91 which is welded at one end to sleeve 77 and at the other end to tube 90 which extends crossways between side frames 12 and 13. Tube 90 is made integral with side frames 12 and 13 adjacent curvatures 27 and 28 by welding, therefore, side frames 12 and 13, bar 91, sleeve 77 and disc 78 are integrally connected, non-movable members. A shaft 77a is rotatably mounted through sleeves 75, 76, 77 and is held in a confined lateral position by these sleeves. A handle bar 80 is integrally secured to shaft 77a immediately adjacent and in sliding relation against disc 78. A second bar 92 of shorter length, is fixedly secured to handle bar 80 by screws 93.

Bar 92 is mounted so that it slides with handle bar 80 against disc 78 on the side opposite handle bar 80. A release handle 81 is pivotally mounted, by pin 94, on handle bar 80. Handle 81 has a spring 82 attached thereto at 95 which extends down to a release member 83 and is secured thereto at 96. A connecting member 84 secured to handle 81 and running down to release member 83 causes release member 83 to disengage from notches 79 when release handle 81 is mashed back towards handle bar 80 by the operator's hand. Spring 82 causes release member 83 to engage notches 79 when handle 81 is released.

Connecting bar 70 extends from leg 61 upward and is pivotally secured to shaft 77a. A second connecting bar 85 extends upward from the other side of hand truck 10 where it is connected to a leg identical in construction to leg 61 but located on that side of the hand truck not described since it is identical to the side described. Bars 70, 85 are pivotally connected with shaft 77a through link 100 and pin 101, therefore, when shaft 77a and integral handle bar 80 is rotated by disengaging release member 83, bars 70, 85 are caused to be lifted or forced downward dependent on the direction of rotation of shaft 77a and integral handle bar 80. The movement of bars 70 and 85 in turn causes toe member 60 and the identical toe member on the opposite side of truck 10 to be raised or lowered.

Figure 3:
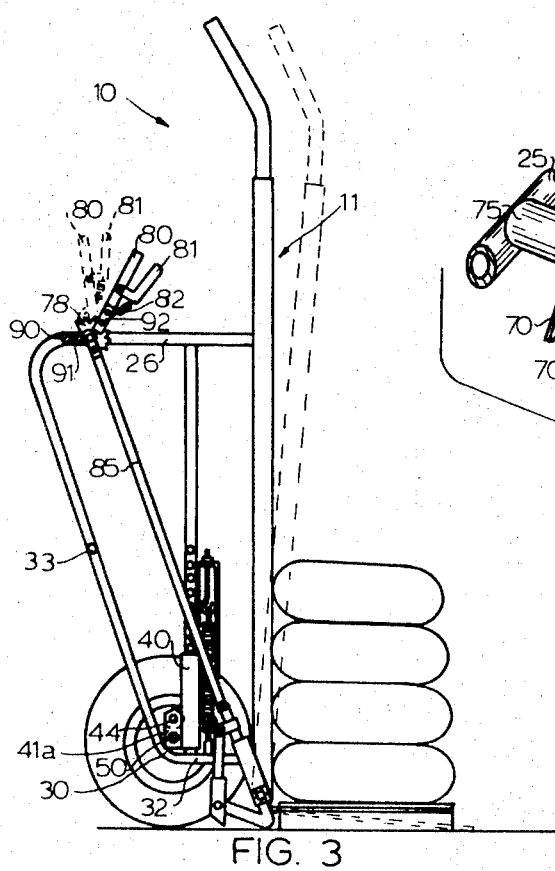
FIG. 3 is a side elevation section view taken along line 3—3 of FIG. 2 and showing in solid lines the hand truck loaded with a pallet holding four bags of fertilizer, a relatively light load, and illustrating in dashed lines the hand truck tilted forward and being slid beneath the pallet prior to engagement of the hand lever controlling the toe members.
Figure 12:
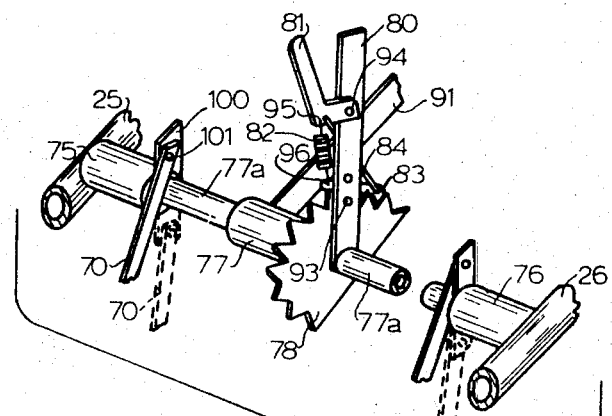
FIG. 12 is a fragmentary perspective view showing the hand lever which actuates the toe members when the hand truck is in place beneath the load.
Figure 10:
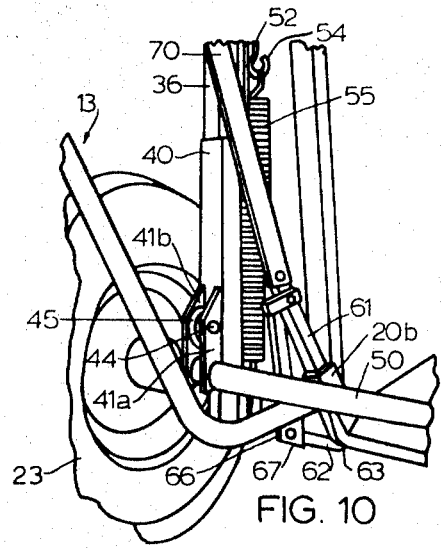
FIGS. 10 and 11 are fragmentary perspective views which illustrates more clearly the roller members which ride up and down on the side frame.
Figure 11:
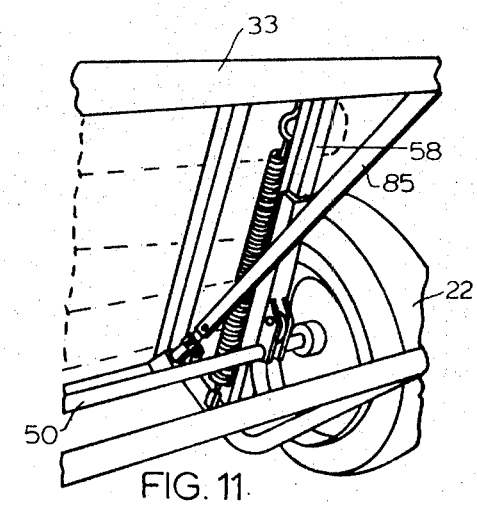
Figure 5:
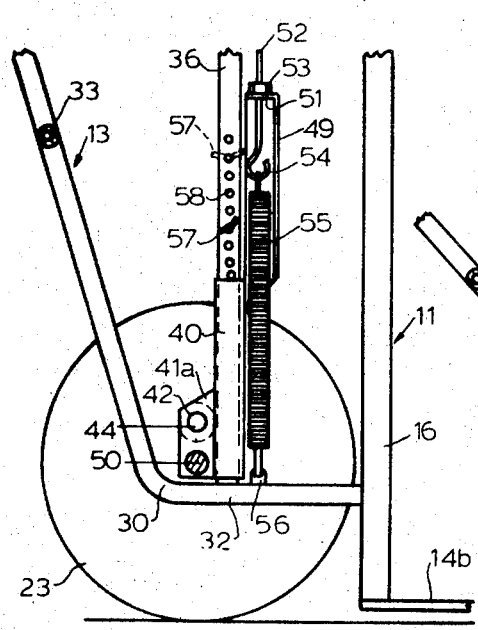
FIG. 5 is an enlarged, fragmentary, elevation section view with the toe member and linkage removed and illustrating in solid lines the sliding member set for receiving four bags of fertilizer and in dashed lines the pin is set for eight bags, a relatively heavy load.
Figure 8:
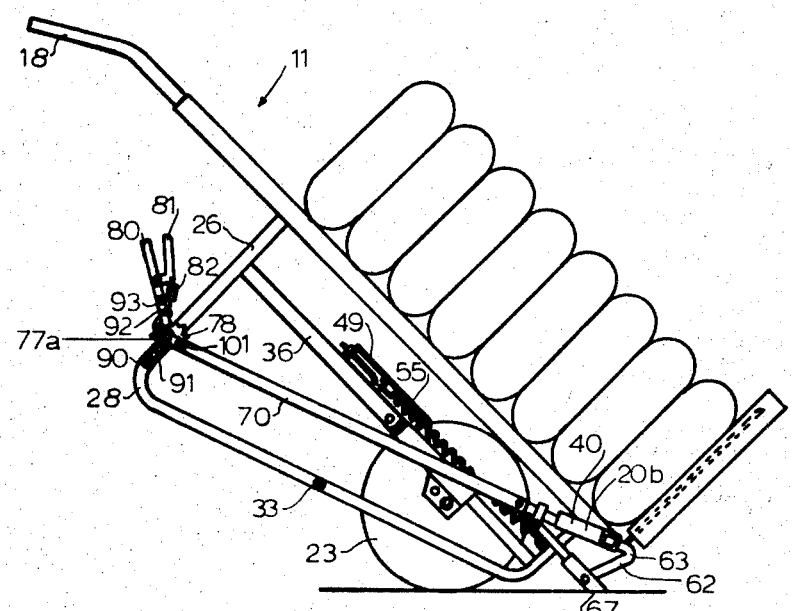
FIG. 8 is a fragmentary side elevation view with the loaded hand truck tilted backward into a position where the load is balanced and rests entirely on the wheels and the intermediate pivots.
Figure 9:
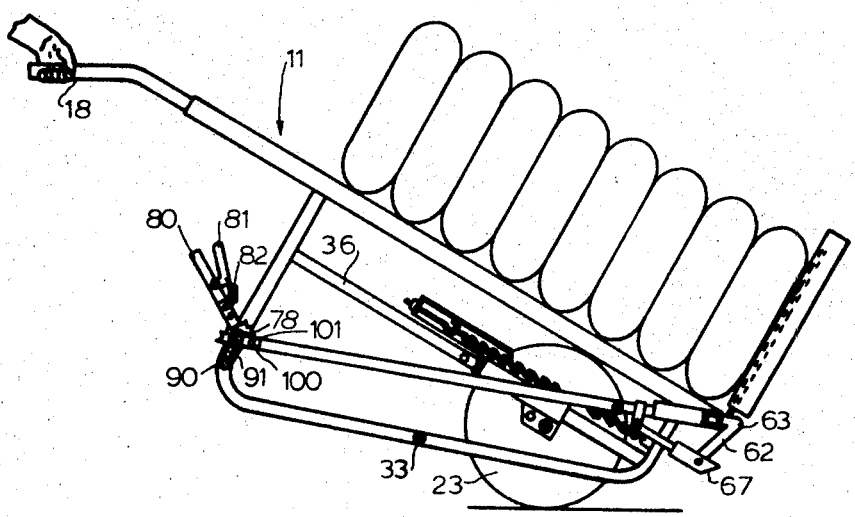
FIG. 9 is a view similar to FIG. 8 except that the hand truck has been tilted backward beyond the FIG. 8 position and the load is supported by the truck wheels and the operator.

Having described the construction of hand truck 10, the description will now be directed to the use and operation of hand truck 10. Hand truck 10 is useful for various jobs, however, for illustration, it will be described as being used for moving fertilizer in bags of 100 lb. sizes. Referring to FIGS. 1, 3 and 5, hand truck 10 is prepared for use, see FIG. 5, by placing cotter pin 57, the axle stop, in the desired hold 58. In this example the hole spacings are related to 100 lb. bag weights and use of the fourth hole from the bottom corresponds to moving four bags at once. FIG. 3, dashed line position, shows the hand truck being pushed up against a pallet which is loaded with four bags of fertilizer. Once load plane 11 is as close to the pallet and fertilizer bags as is possible, handle 81 is gripped and in turn releases release member 83. Bar 80 and integral shaft 77a are rotated towards the load as far as is possible and then handle 81 is released thereby allowing release member 83 to drop into the nearest notch 79 and maintain handle 81 in its position. Rotation of bar 80 and integral shaft 77a have forced bars 70, 85 downward and this in turn forces toe member 60 and the identical toe member for the opposite side down onto engagement with the floor which causes hand truck 10 to assume a vertical position and raises load bearing members 14a, 14b so that they are snugly held against the base of the loaded pallet. Hand truck 10 is now tilted backward, using toe members 60 for pivots, to its free standing position as seen in FIG. 8 with the load being supported by angled based 67 of plate 66 and by the wheels 22, 23. At this point, hand truck 10 will sit by itself fully loaded. By tilting truck 10 further back, see FIG. 9, the load weight first pivots on the angled base members 67 and then rests almost entirely on the wheels which have by now moved back further beneath the load. Once the load has been moved to its new location, truck 10 is tilted forward to the FIG. 8 position once again. In moving forward the truck tilts on the intermediate pivots provided by base plates 67 and then on the pivots provided by toe members 60. Next, the load is set upright, handle 81 is released which through bars 70, 85 allows the toe members to retract and slide back within their respective tubes. Truck 10 can now be moved away from the pallet and load.

Figure 6:
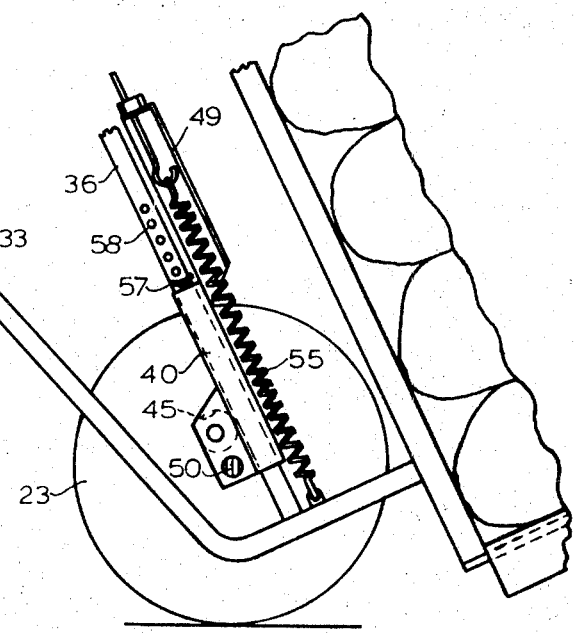
FIG. 6 illustrates in an enlarged fragmentary view the solid line arrangement of FIG. 5 with the pallet and four bags tilted backward.
Figure 7:
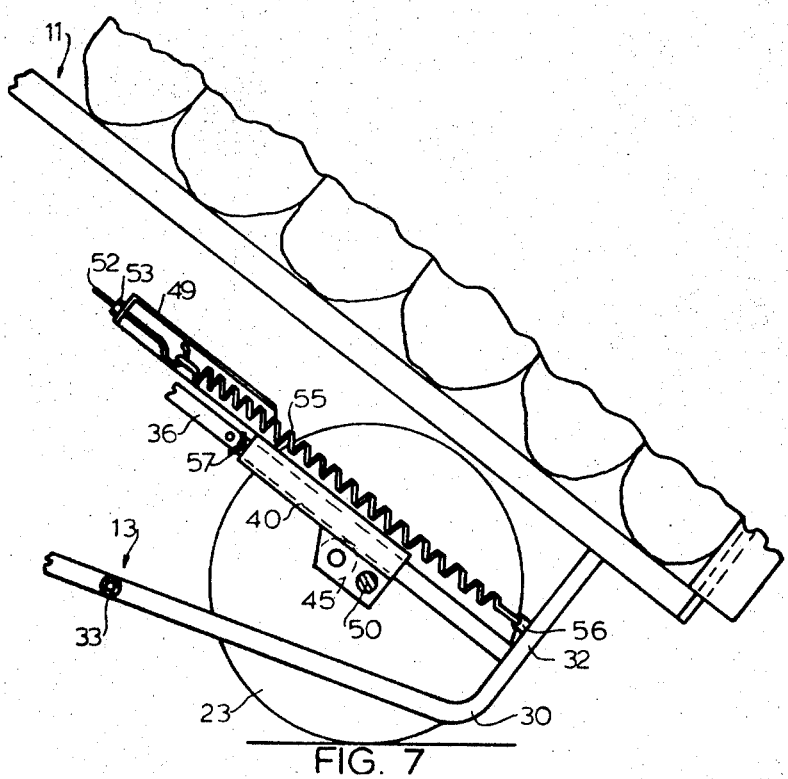
FIG. 7 illustrates in an enlarged fragmentary view the dashed line arrangement of FIG. 5 with the pallet and eight bags tilted backward.

The same operation is performed for all loads except that the axle stop, i.e. cotter pin 57, is placed in the correct holes 58 depending upon the number of bags desired to be moved and where the truck center of gravity is best located. FIGS. 3, 5 and 6 show truck 10 set up for movement of four bags and FIGS. 5 (dashed line cotter pin position), 8 and 9 show an eight bag operation. In all positions for bags from one through 10 bags, the wheels and axle are allowed, when truck 10 is tilted back into carrying position, to move further back beneath the load so that the wheels can be made to bear a major portion of the weight of the load. Of special importance is the fact that by means of the adjustable axle stops the amount of axle travel and consequently the position of the center of gravity can be regulated according to load. Furthermore, with the toe and intermediate pivot members shown the vertical axle shifting is gradual and all tendency to lose the load is eliminated. It will also be noted that the handle mechanism by being positionable in any of several positions allows the load bearing members to accommodate to both relatively low and relatively high pallets.

I claim:

1. A hand truck comprising in combination:
   a. a rigid frame providing a vertically positionable rectangular front loading plane, load receiving means adjacent the base of and extending outwardly from said loading plane and handle means adjacent the top of an extending rearwardly of said loading plane;
   b. toe pivot means adapted with the truck in a vertical loading position to be releasably engaged with the floor at a location substantially immediately below said loading plane and when so engaged causing said load receiving means to move upwardly to engage said load and adapted to provide pivotal support for the truck and its load in forward tilted positions;
   c. an axle-wheel arrangement having a pair of wheels journaled to the ends of an axle and the axle mounted in a plane behind, substantially parallel to and adjacent to the bottom of said loading plane, said wheels being adapted to engage the floor for rearward positioning of said truck following rearward tilting on said toe means; and d. intermediate pivot means formed integral and movable with said toe pivot means, said intermediate pivot means being adapted to provide pivotal support for said truck and load in rearwardly tilted positions between that rearward position where the wheels entirely support the load and that forward position where said toe pivot means entirely support the load.

2. A hand truck as claimed in claim 1 wherein said toe pivot means comprises a pair of toe pivot means positioned on opposite sides of said loading plane.

3. A hand truck as claimed in claim 1 including hand lever and linkage means mounted on said frame and connected to said toe pivot means and being adapted to move and releaseably lock said toe pivot means in any of a plurality of downward positions dependent on the nature of the load being engaged by said load receiving means.

4. A hand truck as claimed in claim 3 wherein said toe pivot means comprises a pair of toe pivot means positioned on opposite sides of said loading plane.

5. A hand truck as claimed in claim 1 wherein the distance between the front loading plane and the parallel center of gravity load plane is greater than the distance between the toe pivot means and the same load center of gravity plane.

6. A hand truck as claimed in claim 5 wherein said toe pivot means comprises a pair of toe pivot means positioned on opposite sides of said loading plane.

7. A hand truck as claimed in claim 5 including hand lever and linkage means mounted on said frame and connected to said toe pivot means and being adapted to move and releaseably lock said toe pivot means in any of a plurality of downward positions dependent on the nature of the load being engaged by said load receiving means.

8. A hand truck as claimed in claim 7 wherein said toe pivot means comprises a pair of toe pivot means positioned on opposite sides of said loading plane.

* * * * *